US012612324B2

(12) United States Patent
McGuire et al.

(10) Patent No.: US 12,612,324 B2
(45) Date of Patent: Apr. 28, 2026

(54) MOBILE WATER TREATMENT PLANT FOR THE REMOVAL OF PFAS CHEMICALS

(71) Applicant: WORLD WIDE CLEAN WATER, LLC, Juno Beach, FL (US)

(72) Inventors: Dennis E. McGuire, Stuart, FL (US); William O. Brisben, Juno Beach, FL (US)

(73) Assignee: World Wide Clean Water, LLC, Juno Beach, FL (US)

( * ) Notice: Subject to any disclaimer, the term of this patent is extended or adjusted under 35 U.S.C. 154(b) by 405 days.

(21) Appl. No.: 18/537,018

(22) Filed: Dec. 12, 2023

(65) Prior Publication Data

US 2024/0190747 A1 Jun. 13, 2024

Related U.S. Application Data

(60) Provisional application No. 63/387,102, filed on Dec. 13, 2022.

(51) Int. Cl.
*C02F 9/20* (2023.01)
*B01D 61/02* (2006.01)
(Continued)

(52) U.S. Cl.
CPC .............. *C02F 9/20* (2023.01); *B01D 61/025* (2013.01); *B01D 61/145* (2013.01); *B01D 61/58* (2013.01); *B01D 65/02* (2013.01); *B01D 2311/04* (2013.01); *B01D 2313/243* (2013.01); *B01D 2321/16* (2013.01); *C02F 1/001* (2013.01); *C02F 1/283* (2013.01); *C02F 1/32* (2013.01); *C02F 1/441* (2013.01); *C02F 1/444* (2013.01); *C02F 1/78* (2013.01); *C02F 2101/322* (2013.01); *C02F 2101/36* (2013.01);

*C02F 2201/008* (2013.01); *C02F 2201/782* (2013.01); *C02F 2303/04* (2013.01);
(Continued)

(58) Field of Classification Search
CPC .. C02F 9/20; C02F 1/001; C02F 1/283; C02F 1/32; C02F 1/441; C02F 1/444; C02F 1/78; C02F 2101/322; C02F 2101/36; C02F 2201/008; C02F 2201/782; C02F 2303/04; C02F 2303/16; C02F 2303/18; C02F 2305/023; C02F 9/00; B01D 61/025; B01D 61/145; B01D 61/58; B01D 65/02; B01D 2311/04; B01D 2313/243; B01D 2321/16; B01D 2311/06; B01D 2311/2626; B01D 2311/2649; B01D 2311/2661; B01D 2311/2692; B01D 61/04; B01D 61/08
See application file for complete search history.

(56) References Cited

U.S. PATENT DOCUMENTS 8,486,275 B2 * 7/2013 Wolf ......................... C02F 9/00
210/741

* cited by examiner

*Primary Examiner* — Waqaas Ali
(74) *Attorney, Agent, or Firm* — McHale & Slavin, P.A.

(57) ABSTRACT

A fully contained water treatment plant for removal of PFAS chemicals. The portable plant will allow engineers to select or modify 11 steps or stages of treatment to suit their particular water source needs. The water treatment plant combines multiple treatment methods into one synergistic process including: Advanced Oxidation (Ozone and UV), Media filtration, and reverse osmosis membrane technologies. The synergistic effect of the combined methods into one specific process will remove 99% of PFAS/PFOS chemicals and can be used to receive contaminated water from oceans, lakes, rivers, or aquifers.

8 Claims, 1 Drawing Sheet

(51) Int. Cl.

| | |
|---|---|
| B01D 61/14 | (2006.01) |
| B01D 61/58 | (2006.01) |
| B01D 65/02 | (2006.01) |
| *C02F 1/00* | (2023.01) |
| *C02F 1/28* | (2023.01) |
| *C02F 1/32* | (2023.01) |
| *C02F 1/44* | (2023.01) |
| *C02F 1/78* | (2023.01) |
| *C02F 101/32* | (2006.01) |
| *C02F 101/36* | (2006.01) |

(52) U.S. Cl.
CPC ...... *C02F 2303/16* (2013.01); *C02F 2303/18* (2013.01); *C02F 2305/023* (2013.01)

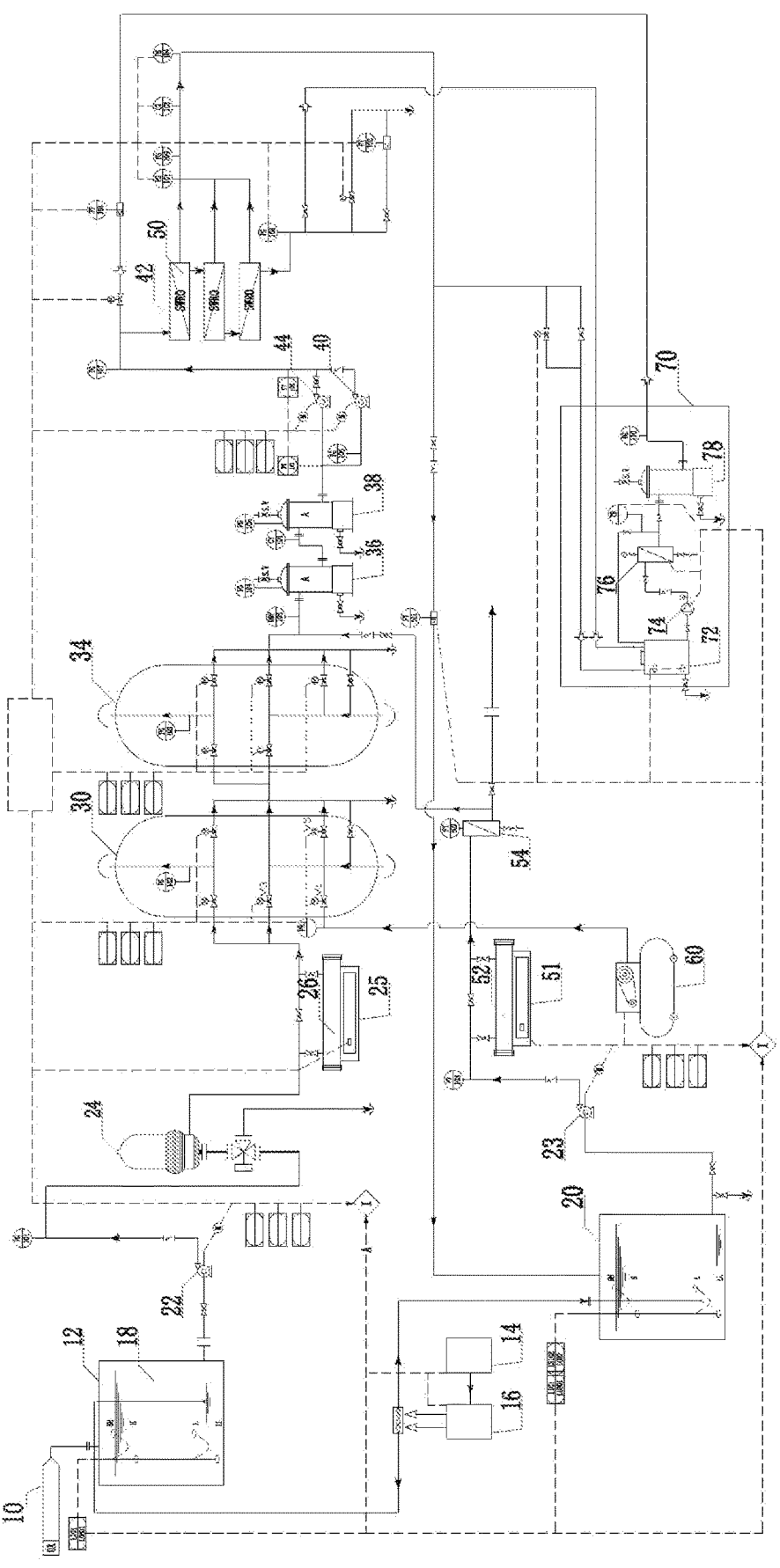

MOBILE WATER TREATMENT PLANT FOR THE REMOVAL OF PFAS CHEMICALS

PRIORITY CLAIM

In accordance with 37 C.F.R. 1.76, a claim of priority is included in an Application Data Sheet filed concurrently herewith. Accordingly, the present invention claims priority to U.S. Provisional Patent Application No. 63/387,102, entitled "MOBILE WATER TREATMENT PLANT FOR THE REMOVAL OF PFAS CHEMICALS", filed Dec. 13, 2022. The contents of the above referenced application are incorporated herein by reference in its entirety.

FIELD OF THE INVENTION

This invention is directed to the field of potable water and, in particular, to a mobile water treatment plant for the removal of PFAS chemicals using ozone and UV nano bubbles in the pretreatment and posttreatment.

BACKGROUND OF THE INVENTION

Perfluoroakly and Polyfluoroalkyl Substances (PFAS) are a group of approximately 5,000 human-made chemicals that are manufactured for their oil and water-resistant properties. Since the 1940s, PFAS have been used in a wide range of consumer products, industrial processes, and in some fire-fighting foams (called aqueous film-forming foam or AFFF). This has resulted in PFAS being released into the air, water and soil.

The two most common and best-studied compounds in the perfluorooctanoic acid PFAS group are (PFOA) and perfluorooctanesulfonic acid (PFOS). Although PFOA and PFOS are no longer manufactured in the United States, they have been replaced with other PFAS alternatives such as hexafluoropropylene oxide dimer acid (used in GenX technology) and perfluorobutanesulfonic acid (PFBS). PFOA and PFOS are still used in manufacturing in other countries; therefore, consumer goods imported to the United States may contain PFOA or PFOS.

PFAS are used in many industrial and consumer processes to make everyday items non-stick, or water-, oil-, or stain-resistant. These include but are not limited to: Food packaging—fast food containers, lunch meat paper, disposable plates and bowls, as well as oil, water, and grease-resistant coatings on food packaging; Commercial household products—non-stick coated cookware (Teflon), cleaning products, waxes, polishes, and adhesives; Clothing and fabric textiles—stain- and water-resistant carpeting and upholstery, water repellant clothing, tents, umbrellas, shoes, and leather goods; Cosmetics and personal care products—shampoos, conditioners, sunscreens, cosmetics, and dental floss; Building and exterior use products—paints and sealants; Industrial use—metal plating and finishing, wire coatings, automotive fluids, and the manufacture of artificial turf; Firefighting foam—aqueous film-forming foam (AFFF).

Given the presence of PFAS in consumer products, disposal of these items into municipal solid waste landfills may be a significant source of PFAS transport into the environment. In the landfill, PFAS can migrate into the liquid waste (leachate) collection system. Leachate is either treated onsite or taken to a wastewater treatment facility to be treated. Disposal of personal care products into home wastewater drains is also a source of PFAS to municipal wastewater treatment facilities. Wastewater treatment is not designed to remove PFAS, and the use of wastewater biosolids as agricultural fertilizers may distribute PFAS into the environment, leading to the further contamination of soil, surface water, and groundwater.

When released to surface water, PFAS may bioaccumulate in freshwater fish and waterfowl. Likewise, plants, livestock, and wildlife in areas irrigated with PFAS contaminated water or treated with PFAS containing biosolids may take up PFAS, but the amount of uptake varies depending on many factors.

PFAS are bioaccumulative, meaning they build up in the body over time. They have long half-lives and take several years to be eliminated from the body. Exposure to PFAS does not necessarily mean that a person will get sick or experience an adverse health effect. Researchers continue working to fully understand the effects on human health. While research on the effects of PFAS exposure on human health is ongoing, current scientific studies have identified possible adverse health effects, such as increased cholesterol levels, increased risk for thyroid disease, low infant birth weights, reduced response to vaccines, liver and kidney toxicity, and pregnancy-induced hypertension.

Several studies of occupational and community exposure of PFAS have been conducted. The studies have found increases in the risk of kidney and testicular cancers associated with PFOA. Studies for other PFAS indicate suggestive evidence of a risk of cancer associated with exposure. Laboratory studies in animals also suggest an increased risk of pancreatic, liver and thyroid tumors due to exposure from PFAS. PFOA is classified by the International Agency for Research on Cancer (IARC) as 2B, possibly carcinogenic to humans. The Illinois Environmental Protection Agency evaluates chemicals classified by IARC as "2B" as carcinogens.

PFAS can be transported through umbilical cord blood and breast milk to the unborn fetus and infant child. Given the bioaccumulative nature of these chemicals, it is important to minimize exposure before, during and after pregnancy. Pregnant women, and women who plan to become pregnant, may consider taking steps to reduce their overall exposure to PFAS, which may include using a household drinking water treatment process certified to remove PFAS or an alternative drinking water source that is tested for PFAS.

The Center for Disease Control (CDC) recommends nursing mothers continue breastfeeding, noting that the benefits outweigh the risks associated with potential PFAS exposure. For bottle-fed infants, if sampling indicates that PFAS is present in drinking water, a household drinking water treatment process or bottled water that has been filtered using reverse osmosis when preparing formula is recommended.

Children are more sensitive than adults to the effects of PFAS and have greater exposure. They tend to drink more water relative to body weight than adults. They have higher exposure to contaminated soils and household dusts from playing outside near the ground and on treated carpets, leading to more ingestion from hand to mouth transfer than adults. Children also do not eliminate chemicals from the body as easily as adults, meaning it will take longer to purge the chemical compared to an adult. In addition to the general health effects listed above, animal studies have indicated that PFAS may be linked to growth, learning, and behavior effects.

The number of U.S. communities confirmed to be contaminated with the highly toxic fluorinated compounds known as PFAS continues to grow at an alarming rate. As of June 2022, 2,858 locations in 50 states and two territories are known to be contaminated.

According to new research, rainfall virtually everywhere on Earth contains levels of per- and polyfluoroalkyl substances (PFAS) that exceed safety limits set by the U.S. Environmental Protection Agency (EPA) and other environmental regulators, affecting even the world's most remote regions. The finding confirms that atmospheric deposition via precipitation is one of many routes by which PFAS contamination spreads throughout long distances and an array of environments, including air, soil, and surface water. It also underscores the health risks of consuming untreated rainwater—a vital source of drinking water in many arid and tropical regions of the world.

Over the past few decades, potable reuse has emerged from obscurity and is now generally accepted as a potential source of new water supply. Potable reuse is a compelling water supply option in many water-stressed places because it is both local and drought resistant. Even parts of the U.S. not typically considered water-short are now pursuing potable reuse because it can provide the dual benefits of water supply and nutrient discharge avoidance. Still, potable reuse sometimes suffers from lingering issues with public perception. Given the recent impact of PFAS on other aspects of the water and wastewater industry, it is important to determine the consequences potential new regulation and new public awareness of PFAS will have for potable reuse projects.

In conventional groundwater treatment projects designed to address PFAS, the treatment technology of choice is typically (pseudo-) absorptive, namely granular activated carbon (GAC) or ion exchange. Other treatment methods are typically ineffective or cost-prohibitive. However, the calculus on PFAS treatment is different in potable reuse, in which cost- and energy-intensive processes are the norm.

Due to the EPA's most recent 2022 proposal to lower the acceptable levels of PFAS in U.S. drinking water, it is believed that local municipalities, hotels, hospitals, universities, and military bases, along with any other organization that provides drinking water at scale, will have inherited a technical and costly engineering problem to deal with in a very short time. Most treatment plants are using outdated, antiquated water treatment methods (i.e. chemicals such as chlorines, polymers, and flocculants) to make potable water from their water supply. Due to the chemical bonds in PFAS and very small particle sizes involved, traditional chemical treatment methods won't work, even with the added carbon and ion exchange media filtration. Additionally, very few providers of Potable Water have Reverse Osmosis membranes installed and available at their water treatment plants.

What is needed is a Mobile Water Treatment Plant to help organizations respond to the challenge of PFAS and meeting upcoming guidelines.

SUMMARY OF THE INVENTION

Disclosed is a portable 11-Step Process water treatment plant that is fully self-contained to remove the family of PFAS chemicals using ozone and UV nano bubbles in the pretreatment and posttreatment. The portable plant is preferably mounted on a vehicle, namely a trailer that can be pulled by a semi-truck. The portable plant will allow engineers to select or modify each of the 11 steps or stages of treatment to suit their particular water source needs. The Water Treatment Solution combines multiple treatment methods into one synergistic process to include: Advanced Oxidation (Ozone and UV), Multi Media, and Membrane technologies (Ultra Filtration and Reverse Osmosis). The synergistic effect of the combined methods into one specific process will result in a solution that is far superior to what is currently designed and recommended to treat PFAS. It is believed that 99% of PFAS will be able to be removed with a combination. The 11-Step Process is capable of receiving any type of contaminated water source (from oceans, lakes, rivers, aquifers or wastewater treatment plants) to make potable water that meets the U.S. EPA's new standards of limits for PFAS in drinking water.

An objective of the instant invention is to provide a self-contained water treatment system to provide clean, potable water that meets PFAS guidelines, on a temporary or permanent basis.

Still another objective of the invention is to provide a self-contained water treatment system that can operate on its own diesel-powered generator or from shore power to treat a contaminated water source with PFAS chemicals.

Yet still another objective of the invention is to provide a self-contained water treatment system that allows engineers the ability to test various types of Ozone (O3) ratios, Ultraviolet (UV) spectrums, different sizes of pre and post filtration, in addition to different materials of Reverse Osmosis (RO) membranes to meet their specific contamination levels water "before" spending millions of taxpayer/shareholder's monies on a solution that doesn't fully remove the family of PFAS contaminants and meet EPA guidelines.

Still another objective of the invention is to provide a self-contained water treatment system wherein various flow rates from 100-1,000 gallons per hour can be adjusted through the various stages of treatment to offer engineers the ability to quantify the best dwell and resident times for reactions to take place on their specific water sources to help understand loading times on the media filters and membranes. Further, engineers will be able to optimize flow rates through the onboard RO membranes to quantify actual results, at their water treatment facility, prior to building a water treatment plant to assure the facility will meet EPA guidelines on allowable PFAS in drinking water.

Other objectives and advantages of this invention will become apparent from the following description taken in conjunction with any accompanying drawings wherein are set forth, by way of illustration and example, certain embodiments of this invention. Any drawings contained herein constitute a part of this specification, include exemplary embodiments of the present invention, and illustrate various objects and features thereof.

BRIEF DESCRIPTION OF THE DRAWINGS

FIG. 1 is a flow diagram of the mobile water treatment plant for the removal of PFAS chemicals.

DETAILED DESCRIPTION OF THE PREFERRED EMBODIMENT

Detailed embodiments of the instant invention are disclosed herein, however, it is to be understood that the disclosed embodiments are merely exemplary of the invention, which may be embodied in various forms. Therefore, specific functional and structural details disclosed herein are not to be interpreted as limiting, but merely as a basis for the claims and as a representation basis for teaching one skilled in the art to variously employ the present invention in virtually any appropriately detailed structure.

Referring to the flow diagram of FIG. 1, the first step of the process directs influent feed water 10 to a treatment tank 12. The feed water 10 is infused with ozone (O3) 14 using a nano bubble diffuser 16. Ozone operates as a strong oxidant capable of destroying the cell walls of microorganisms. Nano bubbles are less than 100 nm in diameter, are hydrophobic and attached to particles surfaces. The ozone nano bubbles will kill and destroy bacteria and viruses, oxidize contaminants, foul odors and flavors, and assist in the treatment of oils, colloids, fine particulates, solids, fats, grease and surfactants. The water 18 in the tank 12 is kept circulating with a bacteria-free fresh water from an onboard fresh water tank 20 that has been treated by a reverse osmosis membranes 50 by a fresh water pump 23. In a preferred embodiment, the water 18 is drawn through a 316SS pump capable of 8 m³/hr. The water 18 is directed by a feed pump 22 through a 50 μm disc filter 24 for removal of large suspended solids, the disc filter configuration providing a large capacity loading of suspended solids. Following the disc filter 24, the water is sterilized with an ultraviolet light 26 and an ultraviolet sterilizer 25 having a synergistic effect of acting on the ozone nano bubbles to create Hydroxyl Radicals (OH—) in a judicial amount to break the DNA bonds of PFAS chemicals. Ozone providing a oxidizing potential of 2.8 eV wherein the ozone/UV combination destroys organic contaminants by the hydroxyl radical which is stronger and less selective then either chemical oxidant. With the increased oxidation levels, organics that otherwise resist degradation can be partially oxidized to the point where they are more readily biodegradable.

A multi-media filtration tank 30 uses various kinds of media combinations to remove suspended solids, sediments, granular impurities, and modified to remove a portion of PFAS/PFOS chemicals. Multi-media filtration cannot be used by itself effectively, but offers synergistic effects when paired with the right combination of treatment methods.

Immediately following the filtration tank 30 is a granular activated carbon filter 34 filled with various activated carbon materials constructed and arranged to remove VOC's (Volatile Organic Compounds) and remove color, smell/odor, microorganisms and more, including a portion of PFAS/PFOS chemicals. The activated carbon will stop the flow of ozone and ozone derivative oxidants. Alternatively, or in addition thereto, an ultra filtration system may be used to replace or supplement the media filters.

The reverse osmosis membranes 50 includes a first 5 μm pre-filter 36 followed by a 1 μm polishing filter 38 to assure the water is free of any solids and other impurities larger than 1 μm before entering an ultra high pressure pump 40 capable of pressurizing membranes 42 to overcome the osmotic pressure of seawater, or alternatively a high pressure pump 44 capable of pressurizing membranes 42 to overcome the osmotic pressure of brackish water. The different pumps allow operation of seawater membranes 42 to make sure that the RO system is capable to treat different water sources. In a preferred embodiment, the seawater reverse osmosis membranes are spiral wound aromatic polyamide. The two different pumps allow the system to efficiently operate by saving electricity power and the cost of replacing brackish water reverse osmosis membranes. The high pressure pumps will pressurize the water to pass though the membranes to produce permeate water with low TDS. For purposes herein, hypersaline sea water has a TDS greater than 35,000 ppm; saline water sea water has a TDS between 10,000 and 35,000 ppm, brackish water has a TDS between 1,000 and 10,000 ppm. Comparatively, water above 1,000 ppm is not suitable for human consumption, water between 350-1,000 ppm is poor quality, water between 250-350 ppm is fair quality, water between 150-250 ppm is good quality, and water less than 150 ppm is excellent quality. Reverse osmosis membranes are a proven method to remove 99% of PFAS/PFOS chemicals.

In the preferred embodiment, the reverse osmosis system provides When the influent seawater TDS is 35,000 ppm and salt rejection at a rate of ≥98.5%; the quality of fresh water will be less than 500 ppm while the World Health Organization WHO standard is less than 1,000 ppm. When Brackish water TDS is 2,000 ppm, the fresh drinking water TDS will be less than 40 ppm.

The Toxicological index: 5~20 times better than WHO drinking water standards. Example: cyanide<0.001 mg/L (WHO—0.05 mg/L); nitrate<0.5 mg/L (WHO—10 mg/L); trichloromethane<0.005 mg/L (WHO~0.06 mg/L). Sensory properties and general chemical indicators: Turbidity<0.1 NTU (WHO~1 NTU); NO odors and NO colors and NO residual chlorine; pH is 6~8; Fe<0.01 mg/L (WHO~0.3 mg/L); chloride<50 mg/L (WHO~250 mg/L); sulfate<20 mg/L (WHO~250 mg/L); Hardness (CaCO3)<100 mg/L (WHO~450 mg/L).

Permeate is further treated with ozone 14 with nano bubbles 16 drawn from the fresh water tank 20 and directed through the UV light 52 and UV sterilizer 51. Permeate is then directed through a 0.22 μm security filter to ensure the fresh water doesn't have any microbial, bacteria, viruses and harmful solids. In one embodiment the system produces 3000 liters per hour on seawater or approximately 19,000 gallons per day; or 4,000 liters per hour on brackish or fresh water producing approximately 25,000 gallons per day.

An air compressor 60 is used in combination with the media filter 54 for backwash. A chemical cleaning system 70 is providing having a holding tank 72 for chemical that is drawn by a cleaning pump 74 and pumped through a heater 76 and 5 μm filter 78 before directing into the reverse osmosis membranes 50 for cleaning.

The present design is primarily directed to the removal of PFAS, the estimated PFAS rejection rate of each system includes: ACF/UV/Ozone about 20%~30%, RO about 95%, and the rejection rate of whole system ≥98.4% (single RO) and ≥99.92% (double RO). A double pass RO will lower capacity of water to be treated but increases PFAS rejection rate for critical applications, such as dialysis use.

In terms of seawater desalination and emergency drinking water treatment for water treatment after a disaster, a disc filter, multi media sand filter, security filter, RO, Ozone nanobubble and UV are necessary because the pre-treatment system guarantees that the large particles are removed to fulfill the requirement of the RO inlet. The post treatment of Ozone/UV and Nanobubble diffuser system is a great substitute for chemical dosing system as the nano bubbles remain in suspension for a long time.

The term "coupled" is defined as connected, although not necessarily directly, and not necessarily mechanically. The use of the word "a" or "an" when used in conjunction with the term "comprising" in the claims and/or the specification may mean "one," but it is also consistent with the meaning of "one or more" or "at least one." The use of the term "or" in the claims is used to mean "and/or" unless explicitly indicated to refer to alternatives only or the alternative are mutually exclusive, although the disclosure supports a definition that refers to only alternatives and "and/or."

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a method or device that "comprises," "has," "includes" or "contains" one or more steps or elements, possesses those one or more steps or elements, but is not limited to possessing only those one or more elements. Likewise, a step of a method or an element of a device that "comprises," "has," "includes" or "contains" one or more features, possesses those one or more features, but is not limited to possessing only those one or more features. Furthermore, a device or structure that is configured in a certain way is configured in at least that way, but may also be configured in ways that are not listed.

All patents and publications mentioned in this specification are indicative of the levels of those skilled in the art to which the invention pertains. It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary, and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A mobile water treatment plant for use in the removal of PFAS (perfluoroalkyl and polyfluoroalkyl substances) chemicals comprising: an influent treatment tank for receipt of feed water; an ozone generator fluidly coupled to a nano bubble diffuser to provide a strong oxidant capable of destroying microorganisms with hydrophobic nano bubbles less than 100 nm in diameter; a 50 μm disc filter positioned after said nano bubble diffuser for removal of suspended solids; a first ultraviolet light providing a synergistic effect by acting on the ozone nano bubbles to create hydroxyl radicals; a multi-media filter constructed and arranged to remove suspended solids, sediments and granular impurities; a granular activated carbon filter to remove volatile organic compounds and a portion of PFAS/PFOS (perfluorooctanesulfonic acid) chemicals and remove ozone and ozone derivative oxidants from the water; a reverse osmosis system to overcome the osmotic pressure of the water forming a permeate with 99% of remaining PFAS/PFOS chemicals removed; a second ultraviolet light injecting ozone with nano bubbles into the permeate; and a security filter fluidly coupled to an outlet of said second ultraviolet light; wherein said mobile water treatment plant is mounted on a portable vehicle using ozone and ultraviolet nano bubbles in the pretreatment and posttreatment.

2. The mobile water treatment plant according to claim 1 wherein said security filter is a 0.22 μm filter to remove microbial, bacteria, viruses and harmful solids from the permeate.

3. The mobile water treatment plant according to claim 1 wherein said multi-media filter includes a modification constructed and arranged to reduce PFAS in the effluent water.

4. The mobile water treatment plant according to claim 1 including an air compressor for backwash of said multi-media filter.

5. The mobile water treatment plant according to claim 1 including an ultrafiltration system to pretreat water entering the reverse osmosis unit.

6. The mobile water treatment plant according to claim 1 including a chemical cleaning system having a chemical holding tank, cleaning pump, and a heater with a post 5 μm filter before directing the cleaning chemical into the reverse osmosis membranes.

7. The mobile water treatment plant according to claim 1 wherein said reverse osmosis system includes a primary high pressure pump and a secondary high pressure pump wherein selection of which pump to operate is dependent upon the water total dissolved solids.

8. The mobile water treatment plant according to claim 1 including a fresh water tank for holding ozone with nano bubbles.

* * * * *